(12) United States Patent
Tinsley, III et al.

(10) Patent No.: US 8,159,802 B2
(45) Date of Patent: Apr. 17, 2012

(54) 3-PHASE POWER FACTOR CORRECTED AC TO DC FILTERED SWITCHING POWER SUPPLY

(75) Inventors: Carl T. Tinsley, III, Manassas, VA (US); Elton Pepa, Dumfries, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 666 days.

(21) Appl. No.: 12/272,263

(22) Filed: Nov. 17, 2008

(65) Prior Publication Data

US 2010/0124083 A1    May 20, 2010

(51) Int. Cl.
*H02H 5/04* (2006.01)
(52) U.S. Cl. ...................................................... 361/93.8
(58) Field of Classification Search ................ 361/93.8
See application file for complete search history.

(56) References Cited

U.S. PATENT DOCUMENTS

| | | | |
|---|---|---|---|
| 4,680,689 A | 7/1987 | Payne et al. | |
| 5,003,453 A | 3/1991 | Tighe et al. | |
| 5,252,911 A * | 10/1993 | Banura | 323/357 |
| 5,321,600 A * | 6/1994 | Fierheller | 363/65 |
| 5,347,191 A | 9/1994 | Wood | |
| 5,530,396 A | 6/1996 | Vlatkovic et al. | |
| 5,764,504 A | 6/1998 | Brand et al. | |
| 5,936,855 A | 8/1999 | Salmon | |
| 6,043,997 A | 3/2000 | He et al. | |
| 6,122,183 A | 9/2000 | He et al. | |
| 6,297,973 B1 | 10/2001 | Jian-Ping et al. | |
| 6,297,980 B1 | 10/2001 | Smedley et al. | |
| 6,385,057 B1 | 5/2002 | Barron | |
| 6,650,560 B2 * | 11/2003 | MacDonald et al. | 363/142 |
| 6,850,426 B2 | 2/2005 | Kojori et al. | |
| 6,950,322 B2 | 9/2005 | Ferens | |
| 7,085,145 B2 | 8/2006 | Sheehy et al. | |
| 7,139,180 B1 | 11/2006 | Herbert | |
| 2003/0128563 A1 | 7/2003 | Rojas Romero | |
| 2003/0218887 A1 | 11/2003 | Kojori et al. | |
| 2004/0202012 A1 | 10/2004 | Ferens | |
| 2005/0117374 A1 | 6/2005 | Sheehy et al. | |
| 2005/0226012 A1 | 10/2005 | Jovanovic et al. | |
| 2006/0215430 A1 | 9/2006 | Fu et al. | |
| 2008/0239771 A1 * | 10/2008 | Wang et al. | 363/44 |

* cited by examiner

*Primary Examiner* — Rexford Barnie
*Assistant Examiner* — Ann Hoang
(74) *Attorney, Agent, or Firm* — Howard IP Law Group, PC (57) ABSTRACT

This invention relates to a power supply apparatus and method for converting three-phase delta AC power to DC power using EMI filters and PFC circuits to maintain balanced AC current loading and reduce radiated and conducted emissions. Overcurrent and temperature protection are also provided in conjunction with a novel optocoupler latch circuit for improving maintenance of the power supply.

11 Claims, 10 Drawing Sheets

3-PHASE POWER FACTOR CORRECTED AC TO DC FILTERED SWITCHING POWER SUPPLY

FIELD OF INVENTION

The present invention relates to naval shipboard power systems and more specifically to three Phase AC-to-DC power conversion.

BACKGROUND OF THE INVENTION

Many naval shipboard power systems currently implement an alternating current (AC) power source such as a three-phase delta power source operating at 60 Hz or 400 Hz. While three-phase delta power is suitable for powering many shipboard electronic components it is not suitable for powering electronic assemblies with direct current (DC) voltage requirements.

Shipboard power systems have numerous additional requirements and constraints as a result of factors such as safety, efficiency and the noise-sensitive nature of the equipment assemblies they power. These considerations result in stringent requirements related to temperature and overcurrent protection as well as for reducing both conducted and radiated emissions. The need to operate efficiently drives an additional requirement to keep the power source balanced. In addition shipboard space limitations impose significant size-constraints on power system equipment. Finally, since replacement parts and qualified maintenance personnel are not always available shipboard power equipment must be designed to be both reliable and easy to maintain.

Existing systems capable of powering DC voltage components from an AC power source suffer various disadvantages making them unsuitable for shipboard operations.

For example, Tighe et al. (U.S. Pat. No. 5,003,453) provides a system for powering DC components based on a three-phase power source. However, the power supply of Tighe et al. is configured to output DC power converted from a three-phase wye power source. This is unlike the three-phase AC delta power sources that are commonly found on shipboard systems. In fact, the power supply of Tighe et al. would be inoperable if combined with a delta power source since, among other reasons, the power supply of Tighe et al. requires a common return or neutral which a three-phase delta power source does not have.

Thus a need exists for a power supply which is capable of converting three-phase AC power to DC power while also being suitable for shipboard installation and operation.

SUMMARY OF THE INVENTION

An exemplary embodiment of the invention provides a small-scale power supply device that converts three-phase delta AC power to DC power while maintaining a balanced AC current loading and reducing radiated and conducted emissions.

In one aspect of an exemplary embodiment of the invention each phase of a three-phase delta power source is first connected to a separate electro-magnetic interference (EMI) filter. Incorporating EMI filters provides the benefit of reducing conducted interference.

In another aspect of an exemplary embodiment of the invention the EMI filters each comprise outputs which are electrically coupled to separate AC-to-DC converters with power factor correction (AC-DC PFC). Power factor correction provides improvements in efficiency and in reduction of radiated emissions. The AC-DC PFC circuitry of the exemplary embodiment also serves to convert each phase of the AC power supply to a DC voltage.

In another aspect of an exemplary embodiment of the invention the AC-DC PFC circuits each comprise outputs which are electrically coupled to separate DC-to-DC isolated converters. Each DC-to-DC isolated converter additionally comprises a first and second output line. In another exemplary aspect of the invention each of the first output lines of the DC-to-DC isolated converters are electrically connected to form a first power supply output connection. Each of the second output lines of the DC-to-DC isolated converters are electrically connected to each other as well as to a ground connection to form a second power supply output connection. The potential difference across these two connections represents the output of the power supply which is a single DC output. Connecting the outputs of the DC-to-DC components in the manner described results in an equal loading across each of the phases. This configuration additionally provides an uncomplicated means for controlling the size of the power supply by simply allowing DC-to-DC converters with a desired rating to be substituted in for the existing DC-to-DC converters. This configuration also allows for easier output scaling which can be achieved by paralleling of the power supply modules.

In another exemplary embodiment of the invention a three-phase delta AC-to-DC power supply is provided in a split-box design that incorporates temperature and overcurrent protection. The power supply comprises two enclosures. The first enclosure includes an EMI filter, an AC-DC PFC converter and a temperature sensor. The second enclosure is connected to the first box via a cable and includes a DC-to-DC converter, a temperature sensor, a current-detecting sensor as well as temperature and overcurrent protection circuitry. The overcurrent and temperature protection circuitry is electrically connected to sensors in both enclosures and is therefore responsible for protecting the components of both enclosures. An arrangement of optocouplers in a latch-style configuration is also incorporated into the temperature and overcurrent protection circuitry. The latch-style design provides a mechanism for reinitializing the power supply after a temperature or overcurrent condition causes the power supply to shut down. This latch-style design provides multiple maintenance benefits. Unlike past designs which relied on the physical replacement of a fuse to reinitialize the power supply, the current design provides an uncomplicated method of simply cycling power to reinitialize the power supply. The present design additionally reduces the need to maintain replacement parts by entirely circumventing the use of fuses.

DETAILED DESCRIPTION OF THE PREFERRED EMBODIMENTS

Reference will now be made in detail to the present exemplary embodiments of the invention, examples of which are illustrated in the accompanying drawings.

The present invention relates to three-phase AC-to-DC delta power conversion in a shipboard power system.

Figure 1:
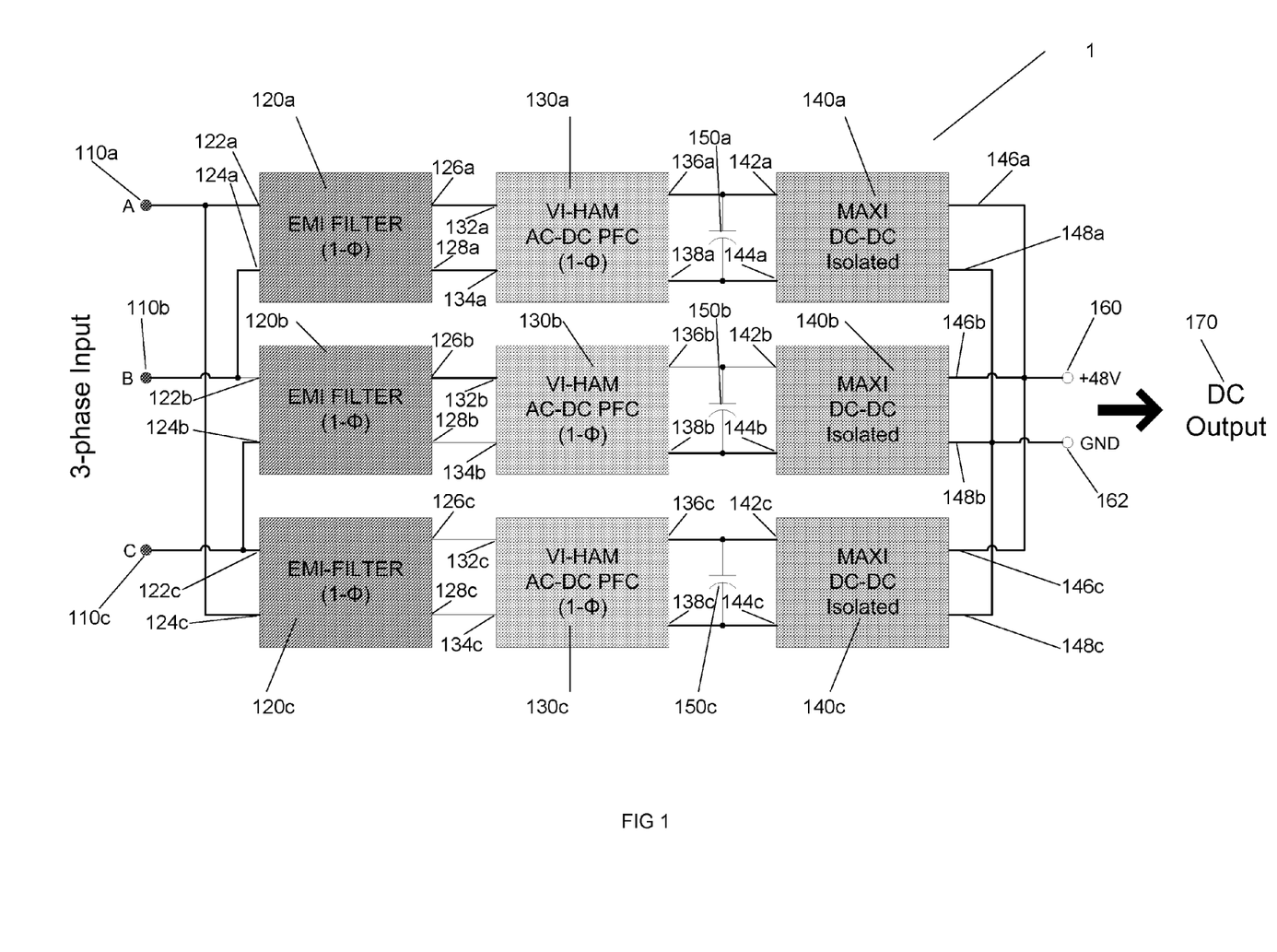
FIG. 1 is a block diagram illustrating a power supply according to an exemplary embodiment of the invention.

FIG. 1 illustrates a block diagram of an exemplary embodiment of a power supply 1 of the present invention configured to convert three-phase delta AC power to DC power. As shown in FIG. 1 the power supply receives three single-phase inputs 110a-c corresponding to each of the three phases of the three-phase AC power source.

Figure 2A:
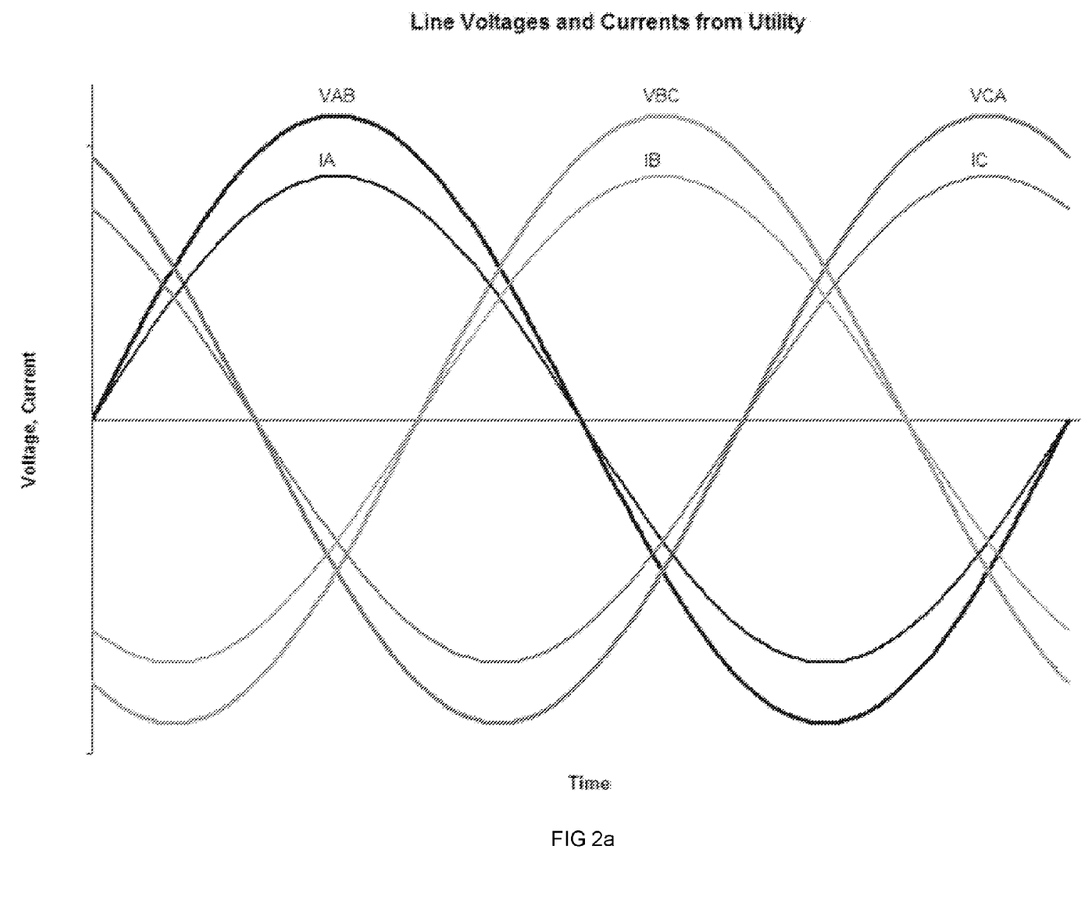
FIG. 2a is a graph illustrating an exemplary three-phase AC signal.
Figure 2B:
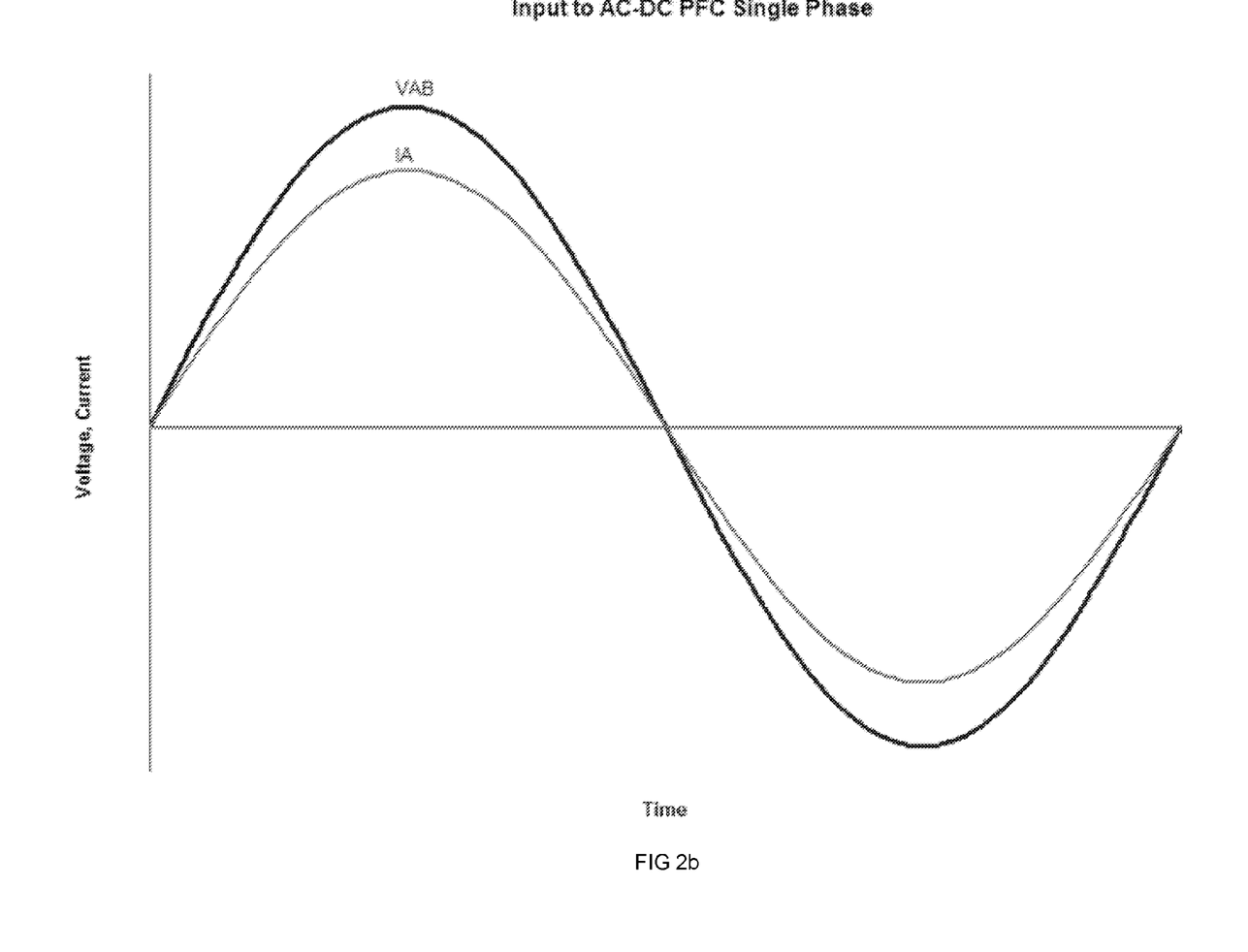
FIG. 2b is a graph illustrating an exemplary single-phase AC signal which may be provided as an input to the power supply of FIG. 1.

FIG. 2a is a graph illustrating an exemplary three-phase AC signal. FIG. 2b is a graph illustrating an exemplary single-phase AC signal which may be provided as one of the inputs 110a-c to the power supply 1 of FIG. 1.

Referring again to FIG. 1, the exemplary power supply of the present embodiment comprises three EMI filters 120a-c, each EMI filter having a first input line 122a-c and a second input line 124a-c. Each EMI filter further comprises a first output line 126a-c and a second output line 128a-c. Each of the three phases 110a-c are electrically coupled to two of the inputs of each of the EMI filters 120a-c in such a way as to provide a substantially equal potential difference across the inputs of each EMI filter 120a-c. In a preferred embodiment of the present invention the EMI filter is implemented using three VICOR 30205 line filters. However, it is understood that an equivalent line filter may be used.

The exemplary power supply 1 of the present invention further comprises three AC-to-DC converters with power factor correction (AC-DC PFC) 130a-c, each AC-DC PFC having a first input line 132a-c and a second input line 134a-c. Each AC-DC PFC further comprises a first output line 136a-c and a second output line 138a-c. Each of the pairs of outputs 126a-c and 128a-c of the EMI filters 120a-c are electrically coupled to one of the pairs of inputs of the AC-DC PFCs 130a-c. In a preferred embodiment of the present invention the AC-DC PFCs are implemented using three AC-DC PFCs manufactured by VICOR Corporation as the VI-HAM-CM. However, it is understood that an equivalent AC-DC PFC may be used.

Figure 2C:
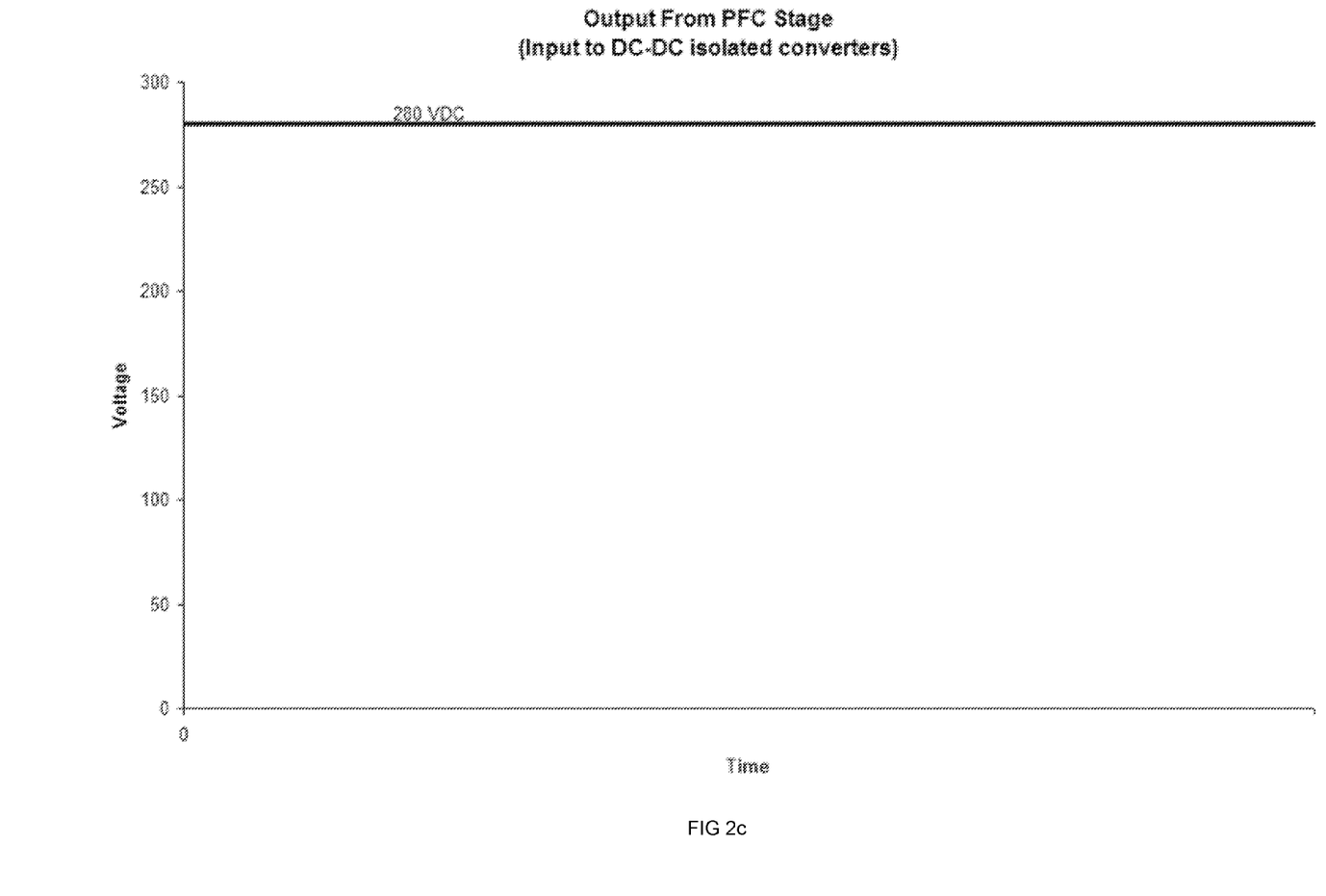
FIG. 2c is a graph illustrating an exemplary output signal from a AC-to-DC power factor correction circuit in accordance with an embodiment of the invention.

FIG. 2c is a graph illustrating an exemplary output signal from the AC-to-DC PFC in accordance with the present embodiment of the invention.

Referring again to FIG. 1, the exemplary power supply 1 of the present embodiment of the invention further comprises three 1000 µF hold-up capacitors 150a-c as well as three DC-to-DC isolated converters 140a-c, each DC-to-DC converter having a first input line 142a-c and a second input line 144a-c. Each DC-to-DC converter further comprises a first output line 146a-c and a second output line 148a-c. Each of the pairs of outputs 136a-c and 138a-c of the AC-DC PFCs 130a-c are electrically coupled to one of the pairs of inputs of the DC-to-DC converters 140a-c. In a preferred embodiment of the present invention the DC-to-DC converters are implemented using three DC-to-DC converters manufactured by VICOR corporation as the MAXI in either a 48 V (V300A48C500BL) or 24V (V300A28C400BL) configuration. However, it is understood that an equivalent DC-to-DC converter may be used.

In another exemplary aspect of the present embodiment of the invention each of the first output lines 146a-c of the DC-to-DC isolated converters are electrically connected to form a first power supply output connection 160. Each of the second output lines 148a-c of the DC-to-DC isolated converters are electrically connected to each other as well as to a ground connection to form a second power supply output connection 162. The potential difference across these two connections represents the output of the power supply which is a single DC output. Connecting the outputs of the DC-to DC converters in the manner described results in an equal loading across each of the phases.

Figure 2D:
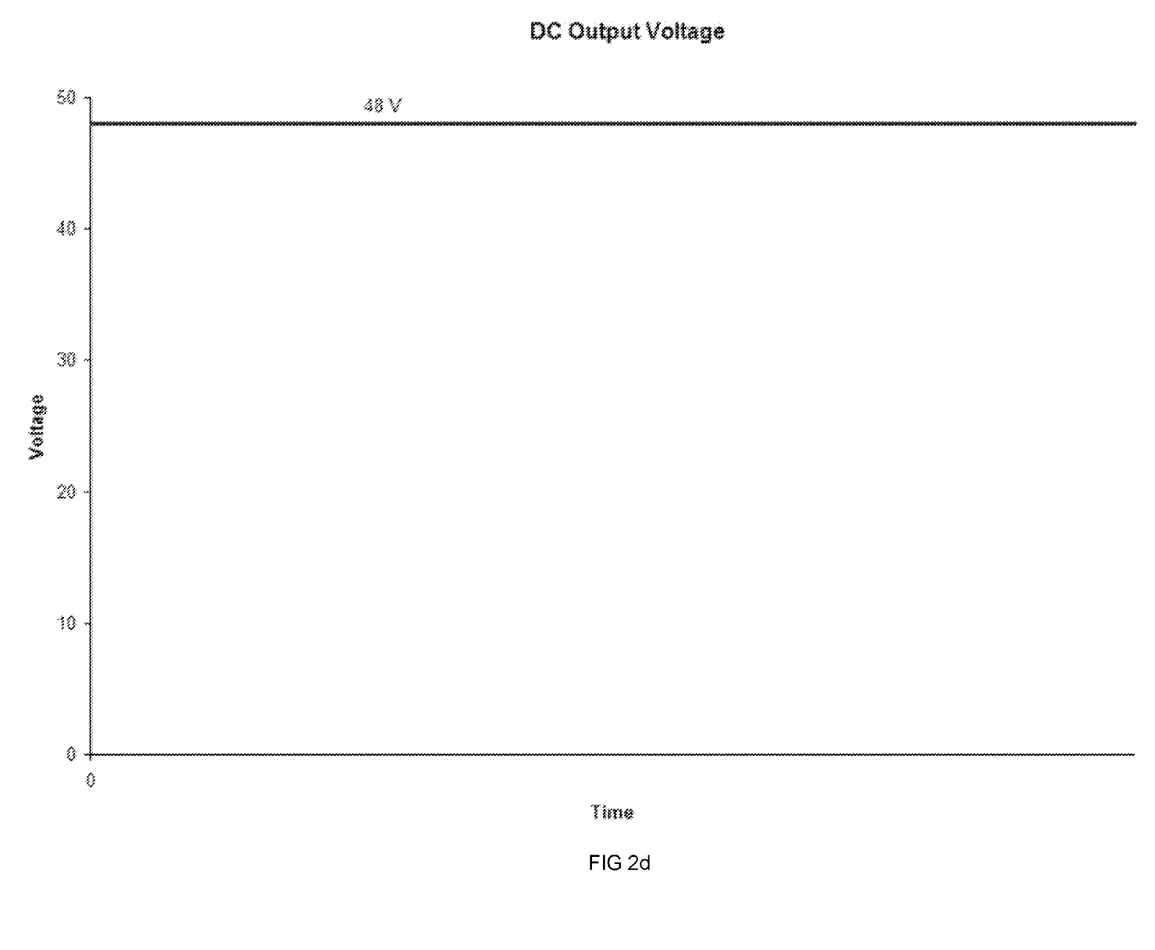
FIG. 2d is a graph illustrating an exemplary overall output signal from the power supply of FIG. 1.

FIG. 2d is a graph illustrating an exemplary overall output signal from the power supply of the present embodiment of the invention.

Figure 3:
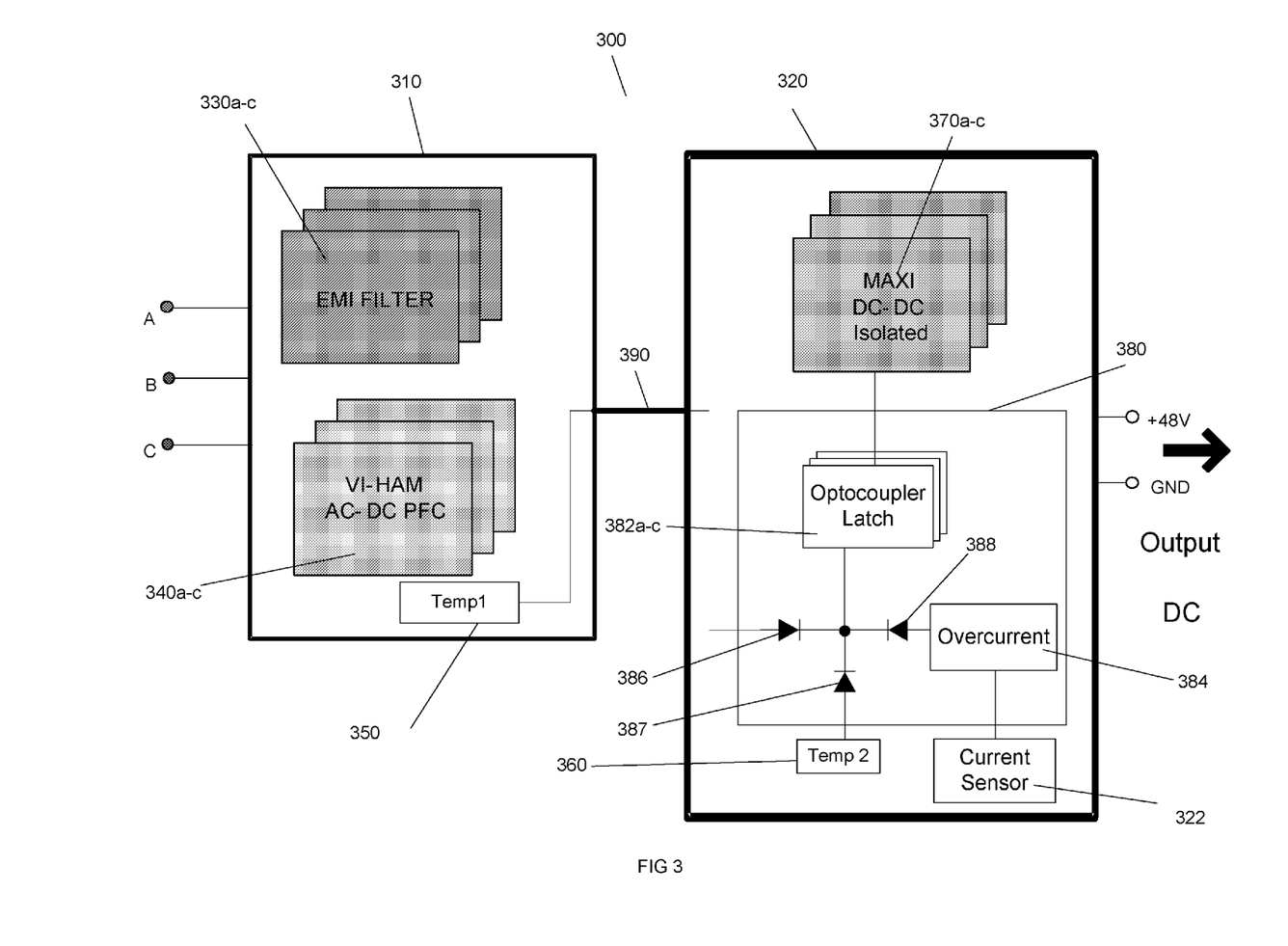
FIG. 3 is a block diagram illustrating a power supply in accordance with a second embodiment of the invention.

FIG. 3 illustrates a block diagram of a second exemplary embodiment of a power supply 300 of the present invention provided in a split-box configuration. The power supply comprises a first enclosure 310 and a second enclosure 320. The first enclosure 310 includes three EMI filters 330a-c, three AC-DC PFCs 340a-c, and a temperature sensor 350. The second enclosure 320, connected to the first box via a cable 390 includes three DC-to-DC converters 370a-c, a temperature sensor 360, a current sensor 322 as well as overcurrent and temperature protection circuitry 380. Overcurrent and temperature protection circuitry 380 further comprises an overcurrent detection circuit 384, three diodes 386, 387 and 388 and three sets of optocoupler latches 382a-c. Outputs from the overcurrent circuit 384, and the temperature sensors 350 and 360 feed into the optocoupler latches 382a-c via one of the diodes 386, 387 and 388. The temperature sensor 350 found in the first enclosure 310 is electrically wired to the overcurrent and temperature protection circuitry 380 found in the second enclosure 320 through cable 390.

The overcurrent and temperature protection aspect of the second embodiment of the present invention will now be discussed in greater detail. As discussed above, overcurrent and temperature protection circuitry 380 receives temperature sensing input from temperature sensors 350 and 360 and receives current detection information from current sensor 322.

Figure 4:
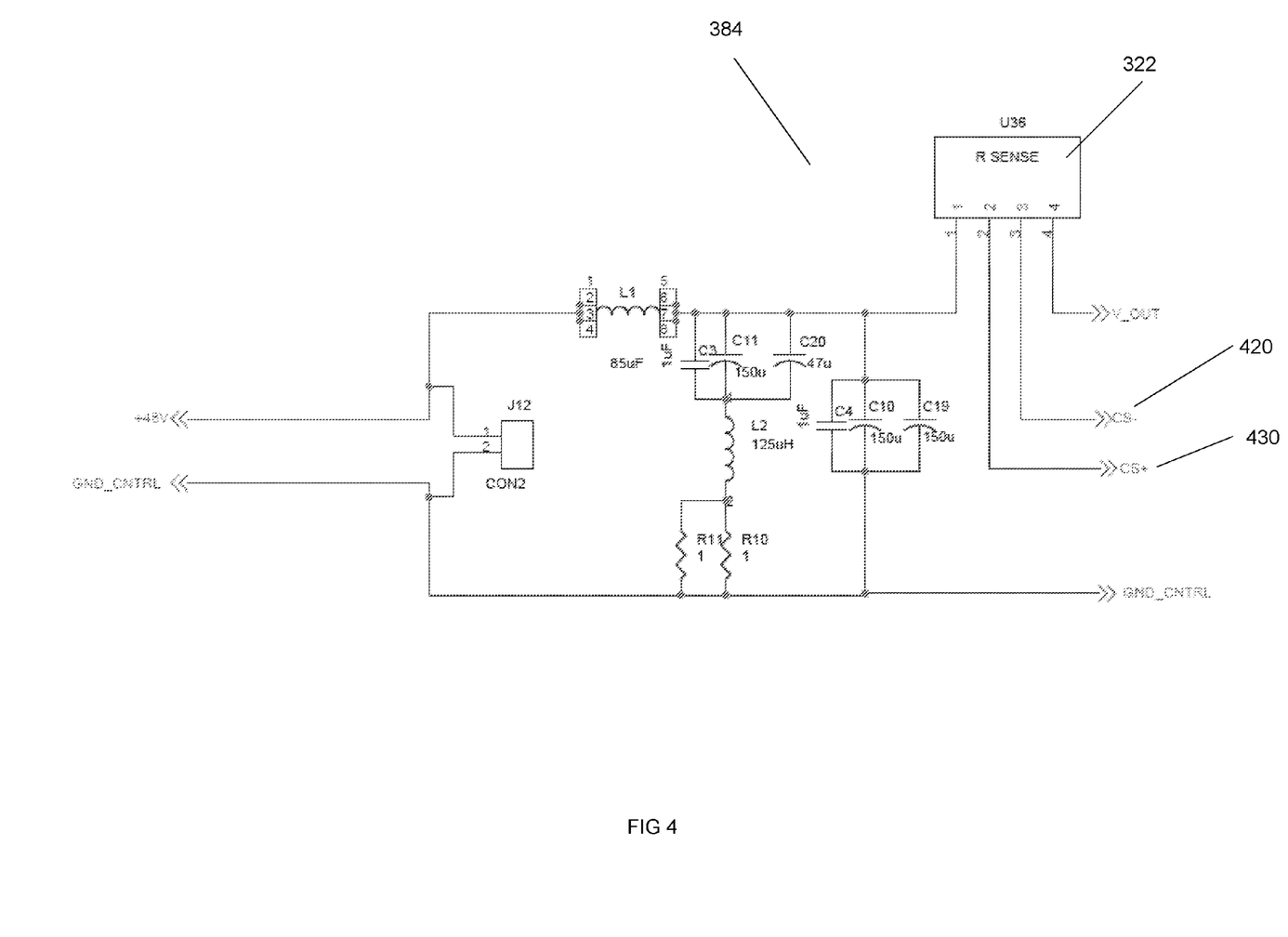
FIG. 4 is a circuit diagram illustrating a current-sensing circuit in accordance with an overcurrent-protecting aspect of the second embodiment of the invention.

Referring now to FIG. 4, the current sensor 322 which may be a current detect resistor further comprises a set of outputs including a first current sensing output 420 and a second current sensing output 430.

Figure 5:
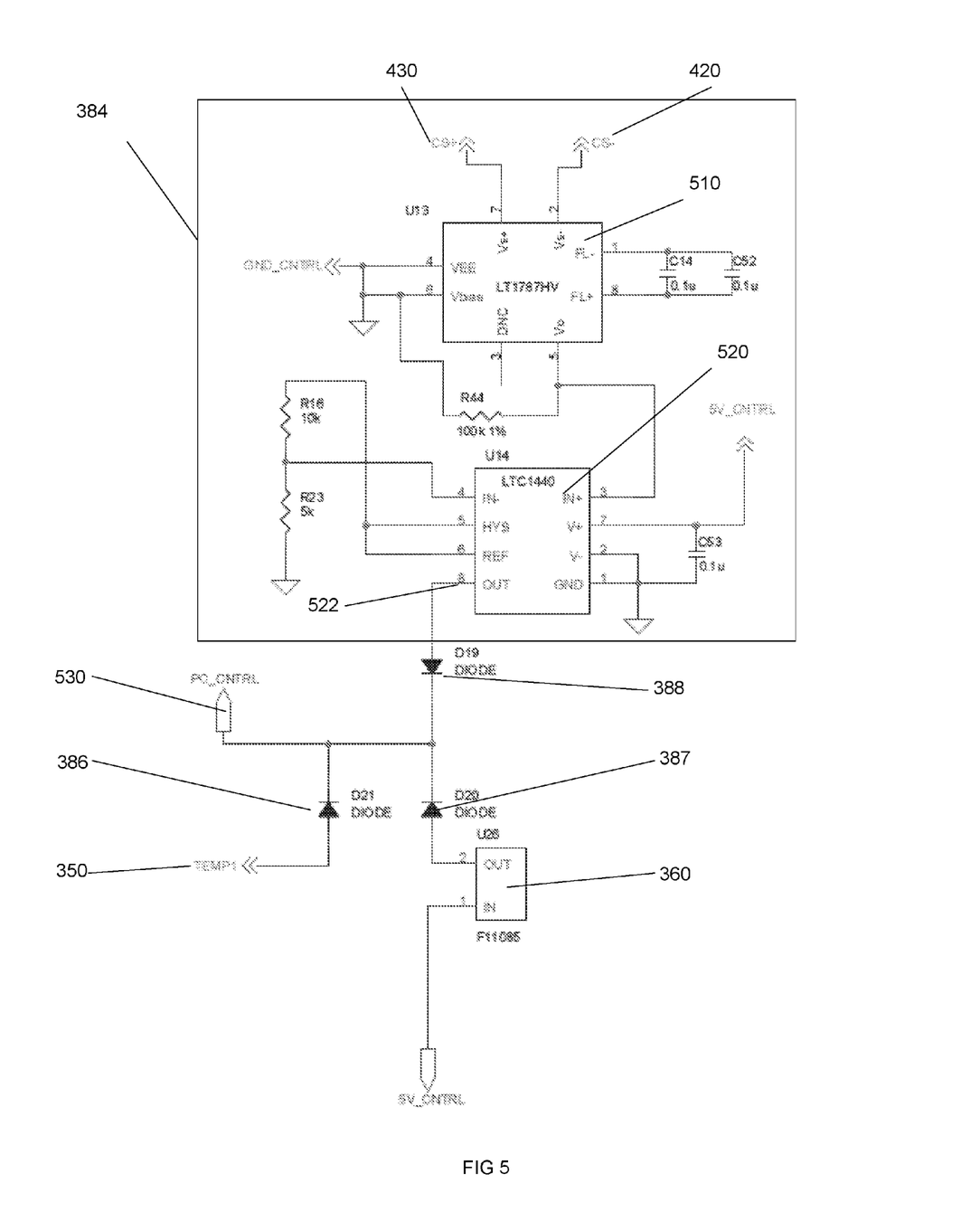
FIG. 5 is a circuit diagram illustrating a circuit in accordance with an overcurrent and temperature protecting aspect of the second embodiment of the invention.

FIG. 5 is a circuit diagram showing overcurrent detecting circuit 384, as well as additional circuitry found within the overcurrent and temperature protection circuit 380. Overcurrent protection circuit 384 comprises a current sense amplifier chip 510 and a power comparator chip 520. The current sense amplifier chip 510 uses the current sensor outputs 420 and 430 to measure and amplify the voltage across the current sensor 322. The comparator chip then receives the amplified voltage and compares it to a set voltage. When the reference voltage exceeds the set voltage the output pin 522 will go high to five volts. Accordingly, an overcurrent condition is detected when output pin 522 switches to a high voltage. FIG. 5 additionally shows diode 386 electrically connected to temperature sensor 350, diode 387 electrically connected to temperature sensor 360 and diode 388 electrically connected to the output pin 522 of comparator 520. Each of the diodes 386-388 feeds into output line 530. Output line 530 feeds into each of the three optocoupler latch circuits 382a-c. Optocoupler latch circuits 382a-c in turn each use the output control signal received over output line 530 to sense when an overcurrent or temperature protection condition has occurred. When either protection condition occurs the optocoupler latch circuits 382a-c will in turn each shut down one of the three DC-to-DC converters 370a-c. Operation of the optocoupler latch mechanism will now be described in greater detail.

Figure 6:
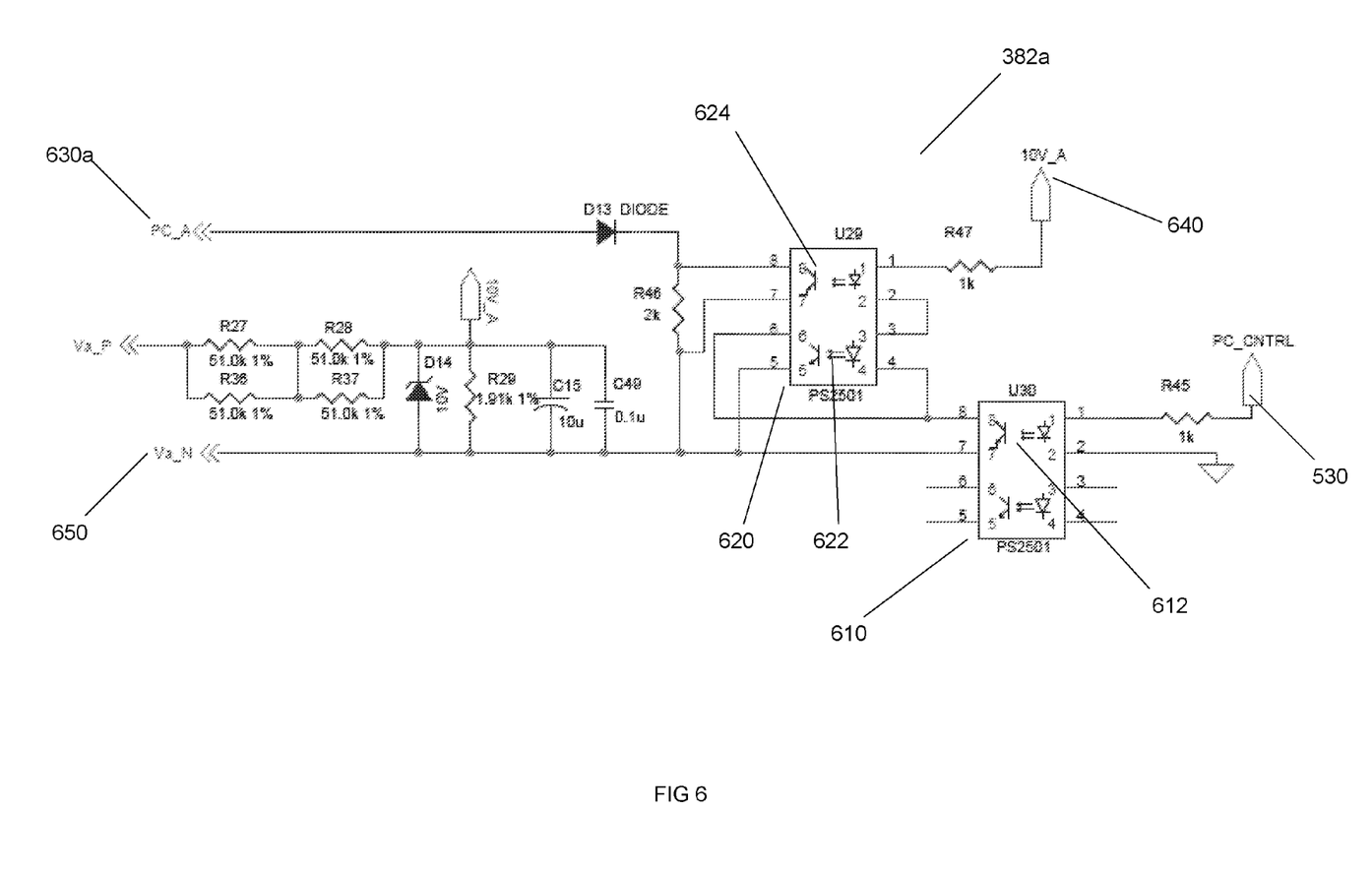
FIG. 6 is a circuit diagram illustrating an optocoupler latch circuit in accordance with an overcurrent and temperature protecting aspect of the second embodiment of the invention.

Referring now to FIG. 6, one of the three optocoupler latch circuits 382a-c of an exemplary aspect of the second embodiment of the invention is shown. Each of the optocoupler latch circuits includes a first optocoupler chip 610 and a second optocoupler chip 620. The first optocoupler chip 610 includes a first optocoupler 612. The second optocoupler chip includes a second optocoupler 622 and a third optocoupler 624. Prior to the detection of an overcurrent or temperature protection condition each of the three optocouplers 612, 622 and 624 in each of the three optocoupler latch circuits 382a-c are held in an OFF state. When an overcurrent or temperature condition arises, the signal received from output line 530 will result in a five volt potential difference across input pins 1-2. This potential difference will cause the first optocoupler 612 to switch to an ON state. Once optocoupler 612 is turned ON both optocouplers 622 and 624 will also turn ON. This is accomplished by providing an electrical connection between an output (pin 8) of optocoupler 612 and an input (pin 4) of optocoupler 622 as well as by providing an electrical connection between the inputs (pins 2 and 3) of optocouplers 622 and 624. At this point, current is allowed to flow from a 10 volt control source 640 through pins 1-2 of optocoupler 624, through pins 3-4 of optocoupler 622 and finally through pins 8-7 of optocoupler 612 to a negative output line 650. This condition results in a high voltage at an optocoupler output line 630a-c (630b-c not shown) of each of the three optocoupler latch circuits 382a-c which in turn causes each of the three DC-to-DC converters 370a-c to shut down.

In order to provide the previously discussed latch functionality, input pin 4 of optocoupler 622 is electrically connected to output pin 6 of optocoupler 622; output pin 5 of optocoupler 622 is additionally connected to the negative output line 650. As a result, even if optocoupler 612 turns OFF, thus breaking the connection between output pins 8 and 7, an alternate path will exist for current to flow across the inputs of the optocouplers 622 and 624 through to the negative output line 650. More specifically, the complete alternate path that is provided starts from the 10 volt control source 640, continues through pins 1-2 of optocoupler 624, through pins 3-4 of optocoupler 622, then finally through pins 6-5 of optocoupler 622 before reaching the negative output line 650. This alternate path allows optocouplers 622 and 624 to remain in the ON state regardless of the operational state of optocoupler 612. In order to reset optocouplers 622 and 624, power is simply recycled. Accordingly, an uncomplicated method of reinitializing the power supply under an overcurrent or temperature protection condition is provided. The amount of replacement parts required is also reduced by entirely circumventing the use of fuses.

Figure 7:
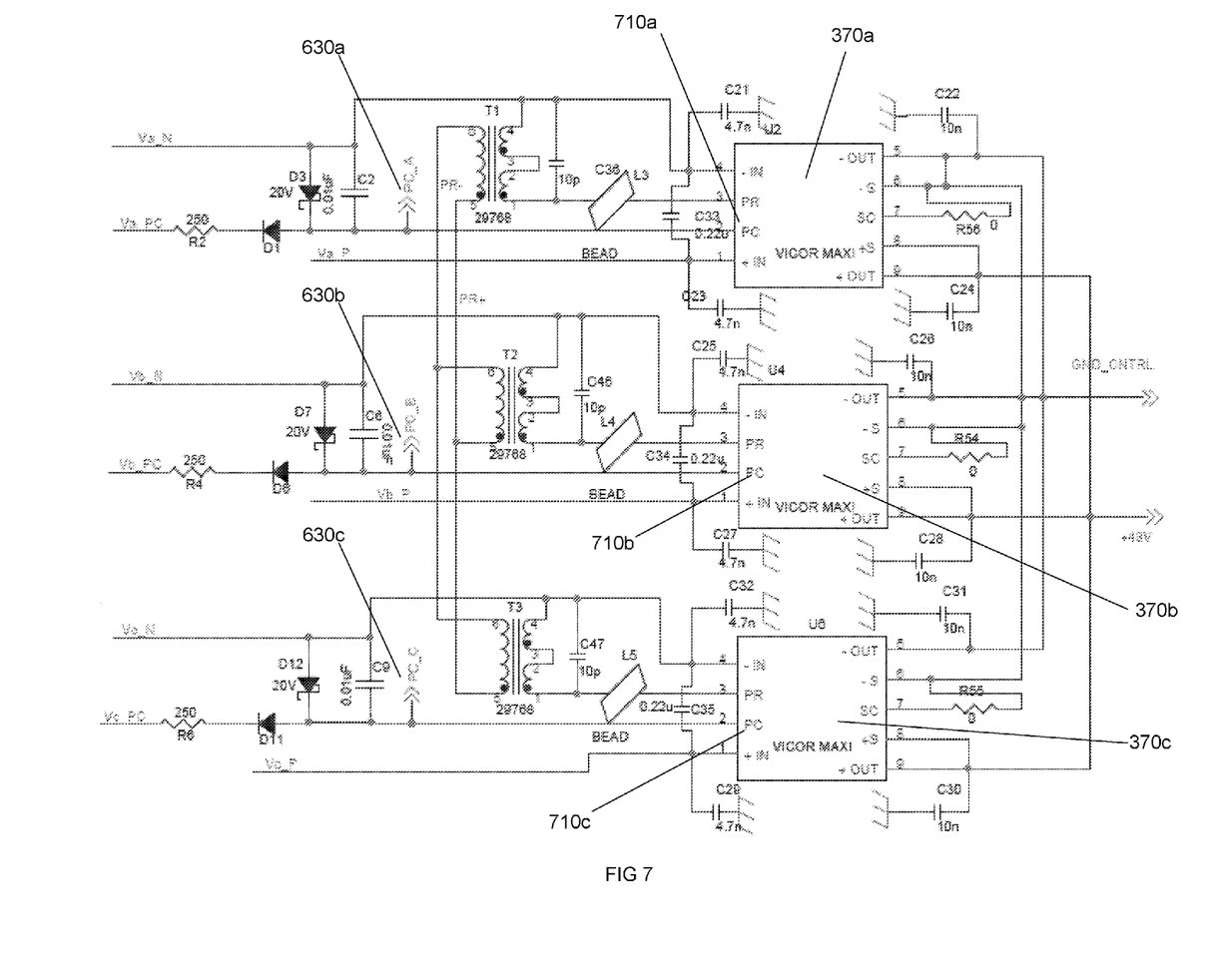
FIG. 7. is a circuit diagram illustrating a DC-to-DC converter in accordance with an embodiment of the invention.

Referring now to FIG. 7, the three DC-to-DC converters 370a-c are shown in greater detail. Each of the three DC-to-DC converters includes a primary control (PC) input pin 710a-c that is electrically connected to one of the optocoupler output lines 630a-c. As previously discussed this connection enables the DC-to-DC converter to be shut down when an overcurrent or temperature condition has been detected.

CONCLUSION

According to embodiments of the present invention the three phase AC-to-DC power supply described herein provides a small-scale power system component capable of converting three-phase AC power to DC power while maintaining a balanced AC current loading and reducing radiated and conducted emissions. Embodiments of the present invention are also capable of detecting overcurrent and temperature conditions and allowing the power supply to be reset with minimal maintenance impact.

While the foregoing describes exemplary embodiments and implementations, it will be apparent to those skilled in the art that various modifications and variations can be made to the present invention without departing from the spirit and scope of the invention. For example, embodiments of the present invention described herein describe converting AC power to DC power from an AC delta power source. However, conversion from different power sources such as a three-phase AC wye power source is also possible with the present invention.

What is claimed is:

1. A power supply that converts three-phase AC power to DC power, comprising:
  a first, second and third converter assembly, each said converter assembly responsive to one of a first, second and third single-phase AC inputs and supplying a DC power supply output;
  each converter assembly comprising:
    (a) an EMI filter adapted to receive one of said first, second and third single-phase AC inputs;
    (b) an AC-to-DC power factor correction circuit coupled to an output of said EMI filter;
    (c) a DC-to-DC isolated converter coupled to an output of said AC-to-DC power factor correction circuit;
    (d) a first and second converter output line;
    wherein each of said first converter output lines are electrically coupled to one another and wherein each of said second converter output lines are electrically coupled to one another as well as to a ground connection for forming the DC power supply output;
  at least one temperature sensor;
  at least one current sensor;
  a plurality of optocouplers arranged in a latch configuration and responsive to the at least one temperature sensor and current sensor for shutting off at least one of the DC-to-DC converters upon detection of an overcurrent or temperature condition by entering a state that causes the at least one of the DC-to-DC converters to be disabled until power is recycled.

2. The power supply of claim 1, wherein each of said single-phase AC inputs is derived from a three-phase delta AC power source.

3. The power supply of claim 1, wherein said plurality of optocouplers arranged in a latch configuration comprises a first set of three optocouplers electrically connected in a latch configuration and coupled to a corresponding one of said DC-to-DC converters.

4. A power supply for converting three-phase AC power to DC power comprising:
  three single-phase AC inputs, wherein each single-phase AC input is derived from a three-phase AC power source;
  three single-phase EMI filters each having an input port and an output port wherein the input port of each EMI filter is electrically coupled to one of said single-phase AC inputs;

three power factor correction AC-to-DC circuits each having an input port and an output port wherein each input port is electrically coupled to one of said EMI filter output ports;

three DC-to-DC isolated converters each having an input port and an output port wherein each output port comprises a first output line and a second output line wherein each input port is electrically coupled to one of said power factor correction AC-to-DC circuit output ports;

a first power supply output line wherein said first power supply output line is electrically coupled to each of the DC-to-DC isolated converter first output lines;

a second power supply output line wherein said second power supply output line is electrically coupled to each of the DC-to-DC isolated converter second output lines and to a ground connection;

wherein the EMI filters, power factor correction AC-to-DC circuits and DC-to-DC converters are adapted to convert 3-phase AC power to DC power;

one or more temperature-sensing circuits;

one or more current-sensing circuits;

three sets of optocouplers, each set of optocouplers electrically coupled in a latch configuration and responsive to the one or more temperature-sensing circuits and one or more current-sensing circuits for shutting off a corresponding one of the DC-to-DC isolated converters when an overcurrent or temperature condition is detected, said corresponding DC-to-DC isolated converters being disabled until power is recycled.

5. The power supply of claim 4, wherein each of said single-phase AC inputs is derived from a three-phase delta AC power source.

6. The power supply of claim 4, further comprising:
a first enclosure containing said EMI filters, said AC-DC circuits, one of said temperature-sensing circuits;
a second enclosure containing said DC-DC circuits, another of said temperature-sensing circuits, said one or more current-sensing circuits, said three sets of optocouplers; and
a cable electrically connecting said first enclosure.

7. A method of converting three-phase AC power to DC power comprising the steps of:
receiving as inputs to a power supply module three single-phase AC signals;
applying an EMI filter to each of said single-phase AC signals;
performing power factor correction on each of said single-phase signals;
converting each of said single-phase AC signals to corresponding first DC signals;
converting, in a corresponding DC-to-DC isolated converter, each corresponding first DC signal to a second DC signal;
combining each of said second DC signals to form a single DC output signal;
receiving a signal indicating detection of an overcurrent or temperature protection condition in an optocoupler latch circuit, and
disabling by the optocoupler latch circuit, each corresponding DC-to-DC isolated converter in response to receiving said signal.

8. The method of claim 7 further comprising the steps of:
reinitializing the power supply after said disabling by recycling power to said power supply.

9. The method of claim 7, wherein the receiving step further comprises receiving each of said single-phase AC signals from a three-phase delta power source.

10. A power supply temperature and overcurrent protection circuit, comprising:
a power supply module having a control line for disabling said power supply module when a predetermined condition has been met;
one or more temperature-sensing circuits;
one or more current-sensing circuits;
one or more sets of optocouplers, each set of optocouplers electrically coupled to the one or more temperature sensing circuits and the one or more current-sensing circuits and to the power supply control line;
wherein the one or more sets of optocouplers are adapted in a latch configuration such that after detection of an overcurrent or temperature condition the optocouplers will enter a state that cannot be exited without recycling power and will cause a signal to be sent over the power module control line that meets said predetermined condition for disabling the power supply.

11. The power supply of claim 10, wherein the predetermined condition comprises exceeding a predetermined current or voltage threshold.

* * * * *